Dec. 27, 1949     W. R. McLAIN     2,492,922
HOLLOW EDUCATIONAL BLOCK
Filed May 23, 1947
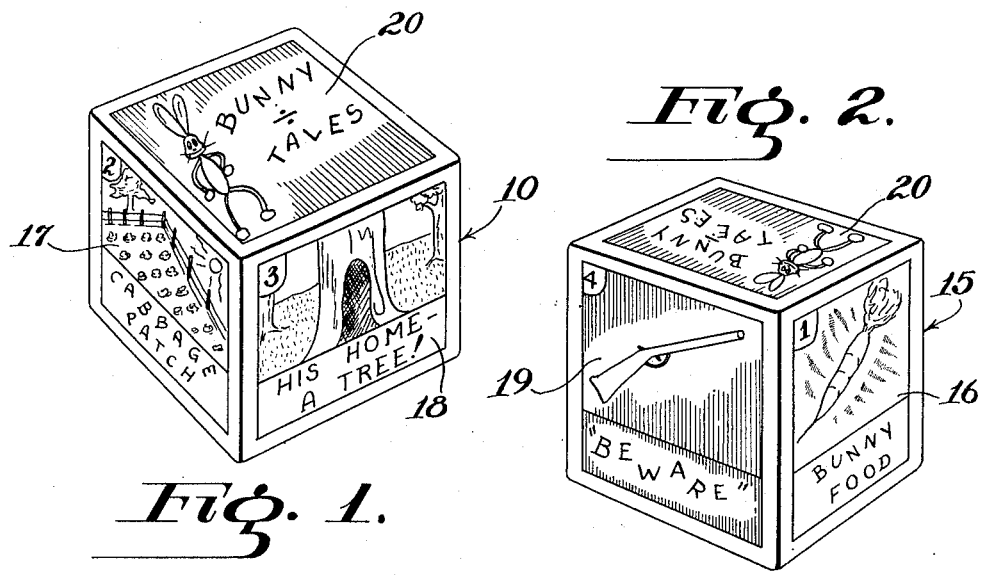
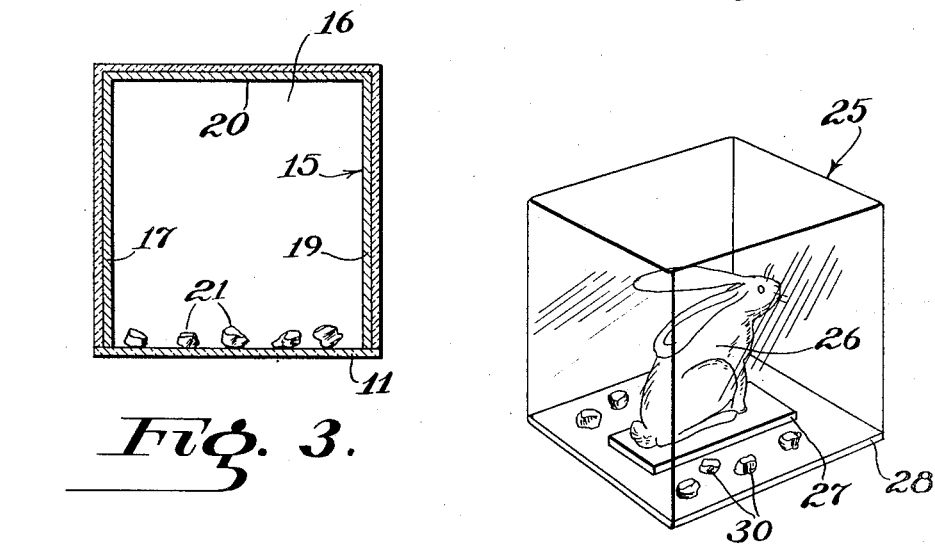
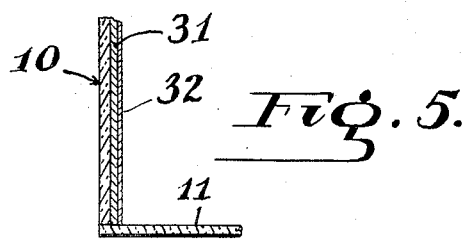
INVENTOR,
Wm. R. McLain
BY
Christian R. Nielsen
ATTORNEY Patented Dec. 27, 1949

2,492,922

UNITED STATES PATENT OFFICE 2,492,922

HOLLOW EDUCATIONAL BLOCK

William R. McLain, Henderson, Ky., assignor to Kusan Incorporated, Henderson, Ky.

Application May 23, 1947, Serial No. 749,928

2 Claims. (Cl. 35—71)

This invention relates to educational devices. It is an object of this invention to provide an educational device, and/or advertising medium in the form of a hollow transparent body, the interior walls of which form a carrier or support for exterior display of inserted printed matter, lithographed, photographed or otherwise reproduced matter, such matter being henceforth defined as indicia in description and claims of this invention, said indicia being molded in the walls, or indicia may be printed on a suitable carrier such as paper, plastic, etc., and inserted in the hollow transparent body so that it engages the inner faces so that said indicia may be externally read or viewed by virtue of the transparent walls.

It is also an object of the invention to provide an educational device and/or toy or advertising medium in the form of a hollow cube having the side walls and top manufactured from transparent materials while the base may be formed of transparent or opaque materials and secured at its periphery to the lower edges of the side walls, an insert, or inserts, being placed within the hollow cube, dimensions of insert or inserts being such that it or they will fit flat against the walls and or top and or bottom of the hollow cube, said insert may cover all or any portion of the total inner surfaces, the attachable bottom of the hollow cube forming a closure to complete the closed cube.

A further object of the invention is the provision of an educational device, and/or toy or advertising medium in the form of a hollow member having transparent side walls and a transparent top, said walls and top being of uniform size and preferably square or rectangular, the bottom being cemented to the lower edges of the side walls so that when the bottom is sealed in place in an airtight manner the hollow member will float on a liquid, an insert or inserts being neatly fitted within the hollow member, each side wall of each insert that is in contact with the inner walls of the hollow member provided with indicia of a related nature depicting scenes and events or facts pertaining to the subject matter, said scenes being in sequence so as to form a connected collection of events or facts, the bottom of the hollow member being transparent a portion of the collection in contact with its inner surface, or opaque without indicia, forms a closure for the hollow member and confining therein pellets for converting the hollow member into a rattle.

Another object of the invention is the provision of an educational device in the form of a hollow member which has the shape of a cube, the side walls and top being made of transparent materials, the lower open end of the hollow member having an opaque base upon which rises a replica of a bird or beast, said base being sealed to the lower edges of the hollow member so that said member will float on a liquid, a plurality of pellets being enclosed to provide a rattle.

The invention consists in the novel constructions, arrangements and combinations of parts hereinafter more particularly described and claimed.

In the drawings:

Figure 1 is a view in perspective of one complete form of an educational device.

Figure 2 is a view in perspective of an insert shown removed from a transparent housing.

Figure 3 is a transverse vertical section of the complete form of the device illustrated in Figure 1, and Figure 4 is a view in perspective of a modified form of educational device in which a replica of the main subject-matter displayed in Figure 1 is enclosed with the hollow casing.

Figure 5 is a fragmentary sectional view illustrating a further manner of securing an indicia bearing sheet to the interior face of a wall of a casing.

Referring more particularly to Figures 1 to 3, 10 designates generally a transparent casing in the form of a hollow cube having an open bottom which is normally closed by a base 11. This base may be transparent so that the interior may be viewed through the bottom for a purpose which will be presently explained. On the other hand, the base may be formed of opaque materials. The periphery of said base is sealed to the lower edges of the side walls of the hollow cube to provide an airtight casing so that said casing will float on a liquid. While a cube has been described, obviously other shapes may be employed, such as a tube or sphere.

An insert designated generally by the numeral 15 (Figure 2) is identical in shape with the transparent casing 10 but has slightly smaller dimensions than said casing so that the insert will fit snugly into the casing. The insert has four side walls 16, 17, 18 and 19 joined together and connected to a top 20. The side walls 17 and 18 of the insert are shown through the contacting and transparent side walls of the casing 10 in Figure 1. The other two sides 16 and 19 of the insert are shown in Figure 2.

The walls and top of the insert may be made of paper or any other suitable materials such as a plaster. The bottom of the insert is open as shown in Figure 3. The insert may be molded or pressed into its final shape.

A series of correlated scenes or pictures are printed on the side walls of the insert. In this particular case a sketch of a rabbit with the indicia "Bunny tales" is printed on the top. The side walls of the insert are numbered from 1 to 4 inclusive, and have scenes applied thereto depicting incidents in the life of a rabbit. Side wall 16, numbered 1, displays a carrot with the indicia "Bunny food," while the side wall 17 numbered 2 shows a cabbage patch as indicative of other food which will entice a rabbit. Side wall 18 numbered 3 pictures a hollow tree as the rabbit's home. Danger to the rabbit is evidenced by a sketch of a gun and the indicia "Beware" on side wall 19 and numbered 4.

A plurality of pellets 21 are sealed within the insert 15 by the base 11 secured to the lower edges of the side walls of the transparent casing 10. The pellets are of irregular shape so that when the casing is shaken by a child, a rattle is produced. These pellets may be made of colored plastic so that they may be viewed through the base when made of transparent materials.

In Figure 4, a modified form is shown which is employed in connection with the educational toy illustrated in Figures 1 to 3 inclusive. In this form, a transparent casing 25 of the same shape and size as the casing 10 is constructed. A replica 26 of a rabbit or a conventional form is molded from plastic and mounted on the base 27. The base is then sealed to the bottom 28 of the casing. On the other hand, the bottom of the casing, the base 27 and the replica 26 may be molded in one piece. The bottom 28 is sealed in any approved manner to the lower edges of the side walls of the transparent casing 25. Before the bottom is fixed in place, pellets 30 similar to the pellets 21 in Figure 3, are placed within the casing 25 to create a rattle.

It will be seen that the device illustrated in Figure 4 will give to a child a clear picture of a rabbit while the insert 15 sealed within the casing 10 will give to the child, with guidance, further information relative to the life and habits of the animal shown in Figure 4.

As shown in Figure 5, an indicia bearing sheet 31 may be laid flat against the interior faces of the casing 10 and secured thereto by applying a molten plastic, wax or the like 32, which when hardened will form an interior shell-like body assuring proper retention of respective sheets. Also, it will be obvious that an indicia sheet may be molded directly within each of the walls of the casing, or sealed to the inner walls by molding the plastic form over the surface of indicia sheet.

I claim:
1. An educational device and/or toy comprising a transparent casing in the form of a cube having an open face which forms the bottom thereof, an insert formed of opaque materials and in the form of a hollow cube with one face open, the dimensions of the insert being slightly less than the dimensions of the transparent casing so that the insert will fit snugly into said transparent casing, the open ends of the casing and insert being in alinement, and a closure for the open end of the casing sealed at the periphery thereof to the free edges of the open end of the casing so that said casing will float on a liquid.

2. An educational device and/or toy comprising a transparent casing in the form of a cube having an open face which forms the bottom thereof, an insert formed of opaque materials and in the form of a hollow cube with one face open, the dimensions of the insert being slightly less than the dimensions of the transparent casing so that the insert will fit snugly into said transparent casing, the open ends of the casing and insert being in alinement, and a closure for the open end of the insert sealed at the periphery thereof to the free edges of the open end of the casing so that said casing will float on a liquid, the surfaces of the insert being in contact with the inner walls and top of the transparent casing and being provided with pictures and/or printed matter of a related nature which can be viewed from an external position through the transparent walls of the outer casing.

WILLIAM R. McLAIN.

REFERENCES CITED

The following references are of record in the file of this patent:

UNITED STATES PATENTS

| Number | Name | Date |
|---|---|---|
| 312,420 | Anderson | Feb. 17, 1885 |
| 756,625 | Haefele | Apr. 5, 1904 |
| 1,223,507 | Mathias | Apr. 24, 1917 |
| 1,449,755 | Hyde | Mar. 27, 1923 |
| 1,646,468 | Warga | Oct. 25, 1927 |
| 1,725,199 | Kuhn et al. | Aug. 20, 1929 |
| 1,833,304 | Putt | Nov. 24, 1931 |
| 1,923,522 | Whitehouse | Aug. 22, 1933 |
| 1,992,087 | Miller et al. | Feb. 19, 1935 |
| 2,235,801 | Herliny | Mar. 18, 1941 |
| 2,319,162 | Short | May 11, 1943 |
| 2,440,205 | McLain | Apr. 20, 1948 |

FOREIGN PATENTS

| Number | Country | Date |
|---|---|---|
| 456,067 | Great Britain | Nov. 3, 1936 |